United States Patent
Agrawal et al.

(10) Patent No.: US 9,438,668 B2
(45) Date of Patent: Sep. 6, 2016

(54) SYSTEM AND METHOD FOR MANAGING MESSAGE QUEUES IN A PEER-TO-PEER COMMUNICATION NETWORK

(71) Applicant: Tata Consultancy Services Limited, Maharashtra (IN)

(72) Inventors: Nishant Kumar Agrawal, Maharashtra (IN); Himanshu Kumar, Maharashtra (IN); Manoj Karunakaran Nambiar, Maharashtra (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 209 days.

(21) Appl. No.: 14/466,279

(22) Filed: Aug. 22, 2014

(65) Prior Publication Data
US 2015/0058404 A1 Feb. 26, 2015

(30) Foreign Application Priority Data
Aug. 22, 2013 (IN) .......................... 2744/MUM/2013

(51) Int. Cl.
*G06F 15/16* (2006.01)
*H04L 29/08* (2006.01)

(52) U.S. Cl.
CPC ....... *H04L 67/1034* (2013.01); *H04L 67/1008* (2013.01); *H04L 67/104* (2013.01)

(58) Field of Classification Search
CPC ............................. H04L 67/42; H04L 67/104
USPC ........................................................ 709/203
See application file for complete search history.

(56) References Cited

U.S. PATENT DOCUMENTS

| | | |
|---|---|---|
| 5,680,551 A | 10/1997 | Martino |
| 7,624,308 B2 | 11/2009 | Critchley et al. |
| 8,239,520 B2 | 8/2012 | Grah et al. |

OTHER PUBLICATIONS

Peter Egli; "MOM—Message Oriented Middleware: Overview of Message Oriented Middleware Technologies and Concepts"; http://www.slideshare.net/PeterREgli/mom-message-oriented-middleware?next_slideshow=1; Feb. 2012; slides 1-25.*
Nikolay K. Diakov, "Monitoring Distributed Object and Component Communication" CTIT PhD.—thesis series No. 04-63, Telematica Instituut Fundamental Research Series, No. 012 (TI/FRS/012).
T. Abdelzaher, S. Dawson et al, "ARMADA Middleware and Communication Services" The International Journal of Time-Critical Computing Systems, 16, 127-153 (1999).

* cited by examiner

*Primary Examiner* — Glenford Madamba
(74) *Attorney, Agent, or Firm* — Thompson Hine LLP

(57) ABSTRACT

Disclosed is a method and system for managing one or more message queues in a peer-to-peer communication network. The system comprises of an initialization module, a queue manager, a load balancing module, a queue monitor and a fault detection and handling module. The initialization module initiates a communication channel between one or more peers through the message queue. The queue manager is configured to manage communication between peers through a unified communication system. The load balancing module uniformly distributes a load across the message queues for a transaction. The queue monitor is configured to monitor the message queues corresponding to a service and a transcode related to the service. The fault detection and handling module is configured to detect state of the server in the unified communication system and dynamically route the messages in the message queue to a next available server.

11 Claims, 16 Drawing Sheets

SYSTEM AND METHOD FOR MANAGING MESSAGE QUEUES IN A PEER-TO-PEER COMMUNICATION NETWORK

CROSS-REFERENCE TO RELATED APPLICATIONS AND PRIORITY

The present application claims priority to Indian Patent Application No. 2744/MUM/2013, filed on Aug. 22, 2013, the entirety of which is hereby incorporated by reference.

TECHNICAL FIELD

The present subject matter described herein, in general, relates to peer-to-peer communication through a unified communication system, and more particularly for managing message queues in the peer-to-peer communication network.

BACKGROUND

In an era of network enabled communication systems, a unified communication system provides for an integrated and flexible mode of communication between enterprise applications. A unified communication system together with queued messaging is an effective and reliable way of communication between enterprise applications. Queue managers facilitate management of the queue in order to transmit and receive a message in a peer-to-peer communication network. In order to execute a reliable communication, a message queue needs to be monitored to detect errors or faults in the communication network.

There exist various methods for managing and monitoring the message queue and for detecting faults and errors therein. However, the existing methods only provide for detecting the delivery status to the message queue thereby failing to provide for overall monitoring of the message queue.

Further, the existing methods are not lightweight and do not efficiently provide for load management of queues in case of an overload. Also, the existing methods fail to dynamically monitor the performance of the resources used for the purpose of communication in the peer-to-peer communication network.

SUMMARY

This summary is provided to introduce aspects related to systems and methods for managing one or more message queues in a peer-to-peer communication network, and the aspects are further described below in the detailed description. This summary is not intended to identify essential features of the claimed subject matter nor is it intended for use in determining or limiting the scope of the claimed subject matter.

In one implementation, a system for managing one or more message queues in a peer-to-peer communication network is disclosed. The system comprises of a processor and a memory coupled to the processor, wherein the processor is capable of executing a plurality of modules stored in the memory. The plurality of modules comprises an initialization module configured to initiate a communication channel between one or more peers through the message queue. Further, a queue manager is configured to manage communication between peers through a unified communication system, wherein the queue manager enables the peer to identify the message queue in order to transmit and receive a message. The queue manager further comprises a load balancing module configured to uniformly distribute load across the message queues for a transaction in the unified communication system based upon a pre-defined condition. Further, a queue monitor is configured to monitor the message queues corresponding to a service and a transcode related to the service. The queue monitor further comprises of a fault detection and handling module configured to detect state of the server in the unified communication system, wherein the fault detection and handling module dynamically routes the messages in the message queue to a next available server.

In one implementation, a method for managing one or more message queues in a peer-to-peer communication network is disclosed. The method comprises initiating a communication channel between one or more peers through a message queue. Further, the method comprises managing communication between the peers through a unified communication system and enabling the peer to identify the message queue in order to transmit and receive a message. The managing further comprises distributing uniformly load across the message queues for a transaction in the unified communication system based upon a pre-defined condition. The method further comprises monitoring the message queues corresponding to a service and a transcode related to the service. The monitoring further comprises detecting a state of the server in the unified communication system, wherein the messages in the message queue are dynamically routed to a next available server, wherein the managing, the distributing, the monitoring and the detecting are performed by a processor.

In one implementation, a computer program product having embodied thereon a computer program for managing one or more message queues in a peer-to-peer communication network is disclosed. The computer program product comprises a program code initiating a communication channel between one or more peers through a message queue and a program code for managing communication between peers through the unified communication system and enabling the peer to identify the message queue in order to transmit and receive a message. The managing further comprises of a program code for distributing uniformly load across the message queues for a transaction in the unified communication system based upon a pre-defined condition. The program code further comprises a program code for monitoring the message queues corresponding to a service and a transcode related to the service. The monitoring further comprises a program code for detecting state of the server in the unified communication system, wherein the messages in the message queue are dynamically routed to a next available server.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Indian patent application 1985/MUM/2010, the entire contents of which is incorporated by reference herein, relates to a unified communication method and a unified communication system for a peer-to-peer communication between at least one transmitting device and at least one receiving device in the network. Also, the entire contents of Indian patent application 302/MUM/2012 is incorporated by reference herein.

Systems and methods for managing one or more message queues in a peer-to-peer communication network are described. In order to manage one or more message queues, at first, a communication channel is initiated between one or more peers by reading a message over a session. The communication initiated between the peers is managed by enabling a peer to identify the message queue in order to transmit and receive the message, wherein the communication is initiated through a unified communication system. Further, the managing also comprises uniformly distributing a load across the message queues for a transaction in the unified communication system which is further based on a pre-defined condition.

Further, the message queues corresponding to a service and a transcode related to the service are monitored. The monitoring of the message queues also includes detecting a state of the server in the unified communication system and dynamically routing the messages in the message queue to a next available server.

While aspects of the described system and method for managing one or more message queues in a peer-to-peer communication network may be implemented in any number of different computing systems, environments, and/or configurations, the embodiments are described in the context of the following exemplary system.

Figure 1:
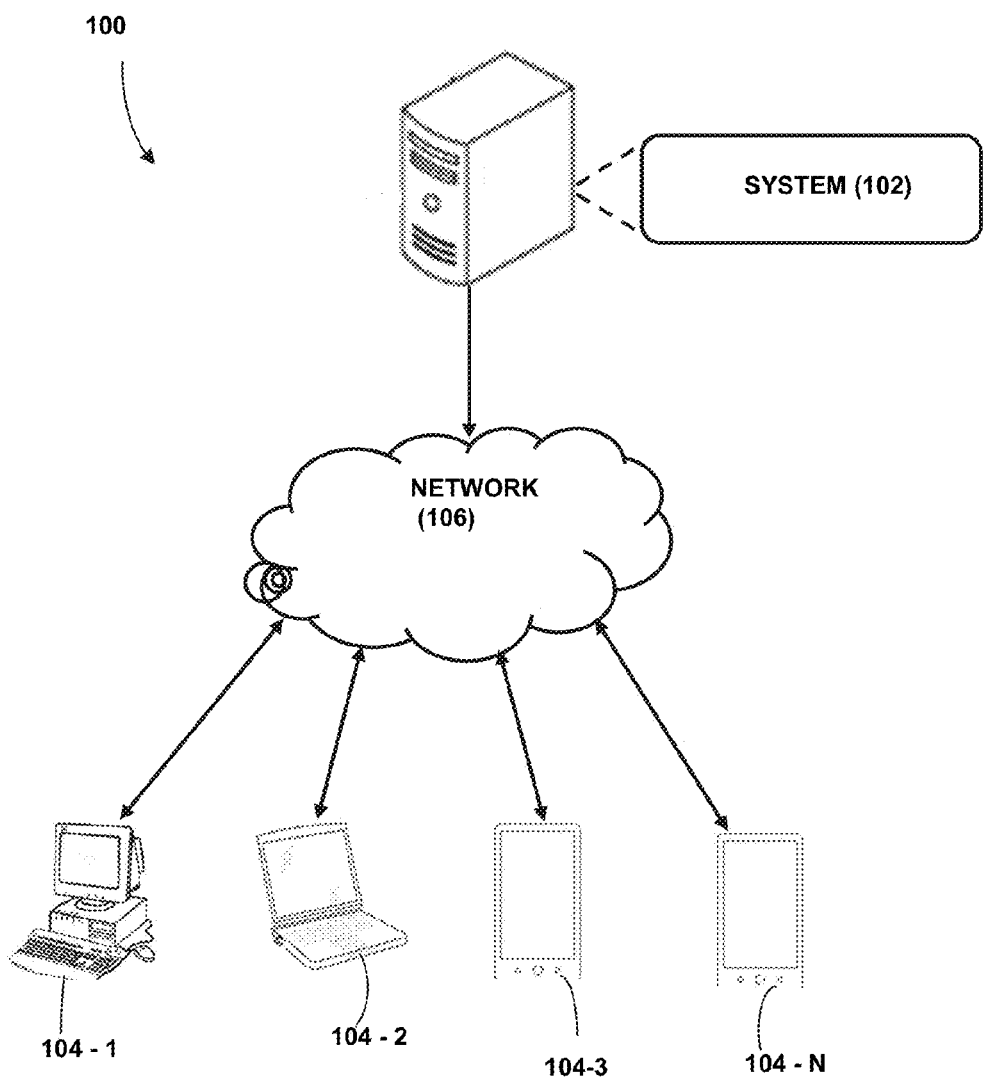
FIG. 1 illustrates a network implementation of a system for managing one or more message queues in a peer-to-peer communication network, in accordance with an embodiment of the present subject matter.

Referring now to FIG. 1, a network implementation 100 of a system 102 for managing one or more message queues in a peer-to-peer communication network is illustrated, in accordance with an embodiment of the present subject matter. In one embodiment, the system 102 for managing one or more message queues in the peer-to-peer communication network is described. At first, a communication channel is initiated between the peers through the message queue. The communication channel is initiated by a client device 104 between the peers through a unified communication system. The communication is managed by enabling the peer to identify the message queue in order to transmit and receive a message. Further, the managing also comprises distributing a load across the message queues uniformly for a transaction in the unified communication system which is further based on a pre-defined condition. Further, the message queues corresponding to a service and a transcode related to the service are monitored. The monitoring of the message queues also includes detecting the state of the server in the unified communication system, and the messages in the message queue are dynamically routed to the next available server.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2, 104-3, . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
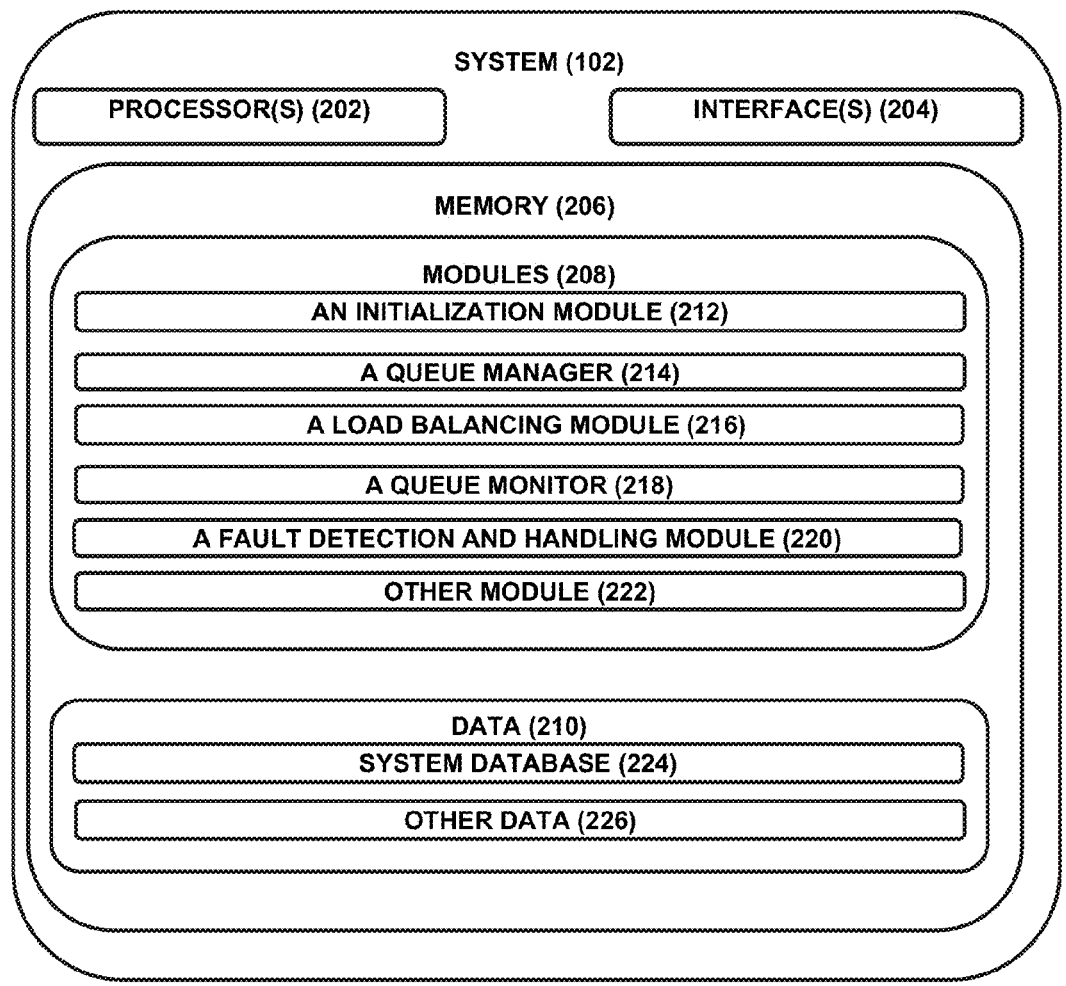
FIG. 2 illustrates the system for managing one or more message queues in the peer-to-peer communication network, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an initialization module 212, a queue manager 214, a load balancing module 216, a queue monitor 218, and a fault detection and handling module 220, and other modules 222. The other modules 222 may include programs or coded instructions that supplement applications and functions of the system 102.

The data 210, amongst other things, serves as a repository for storing data processed, received, and generated by one or more of the modules 208. The data 210 may also include a system database 224, and other data 226. The other data 226 may include data generated as a result of the execution of one or more modules in the other module 222.

In one implementation, at first, a user may use the client device 104 to access the system 102 via the I/O interface 204. The user may register them using the I/O interface 204 in order to use the system 102. The workings of the system 102 may be explained in detail in FIGS. 3, 4, 5, 6, 7, 8, 9, 10, 11, 12, 13, 15, and 16, explained below. The system 102 may be used for managing one or more message queues in a peer-to-peer communication network. In order to manage one or more message queues, at first, a communication channel is initiated between the peers through the message queue. Specifically, in the present implementation, the communication between the peers is initiated by the initialization module 212 through the client device 104. The communication is initiated by reading a message over a session. The session refers to a communication handle between two peers. By way of a specific example, the session is similar to a TCP connection in transport layer. The communication between each peer takes place through the session, and one or more sessions may be established between the peers.

The peer may comprise at least one of a client, a server in case of a client server relationship, a sender, a receiver if the client server relationship does not exist, or a combination thereof. A service name is a public name used to identify the peer or a service. By way of a specific example, "banking" is a service name. The transcode is a code identifying a type of a transaction requested from the service. Every service will have at least one transcode associated with it. For example, the message can be sent to the "Banking" service with the transcode of "100", wherein "100" may be used for identifying a "deposit" transaction within the "Banking" service.

In one implementation, the communication between peers is implemented through a unified message communication library. The unified message communication library (UMC library) ensures that an enterprise application continues to deliver its core functionality in spite of a changing environment. The UMC library shields the enterprise application from changes in the environment while adapting to the changes in the operating environment. The UMC library provides a mechanism for sending and receiving messages. The UMC library implements communication requirements using one of the communication mechanisms available with an operating system or third party middleware. The enterprise applications get one interface and the UMC library shields the enterprise application from the complexities of the underlying communication mechanisms.

The communication mechanism actually used and its details are specified in a UMC configuration file, and it is controlled by the enterprise application administrators. The UMC configuration file may be formatted in XML. Any change in the deployment configuration of the enterprise application may be achieved by reflecting the changes in the UMC configuration file. The enterprise application administrator may select the communication mechanism by setting the UMC configuration file, depending on the quality of service required by the enterprise application and the availability of the communication mechanism.

In one implementation, the system 102 further comprises the queue manager 214 configured to manage communication between peers through the unified communication system, wherein the queue manager 214 enables the peer to identify the message queue in order to transmit and receive the message. The queue manager 102 is configured for every service. By way of a specific example, the configuration of the service is done by setting up the queue manager 214. The servers communicate with the queue manager 214 to get the queue for reading the message from the queue. The client sending the message to the server also contacts with the queue manager 214 to get an appropriate queue.

The queue manager 214 further comprises of the load balancing module 216 configured to uniformly distribute load across the message queues for a transaction in the unified communication system based upon a pre-defined condition. The pre-defined condition defines a threshold for initializing the distribution of load of the message queues uniformly.

Figure 3:
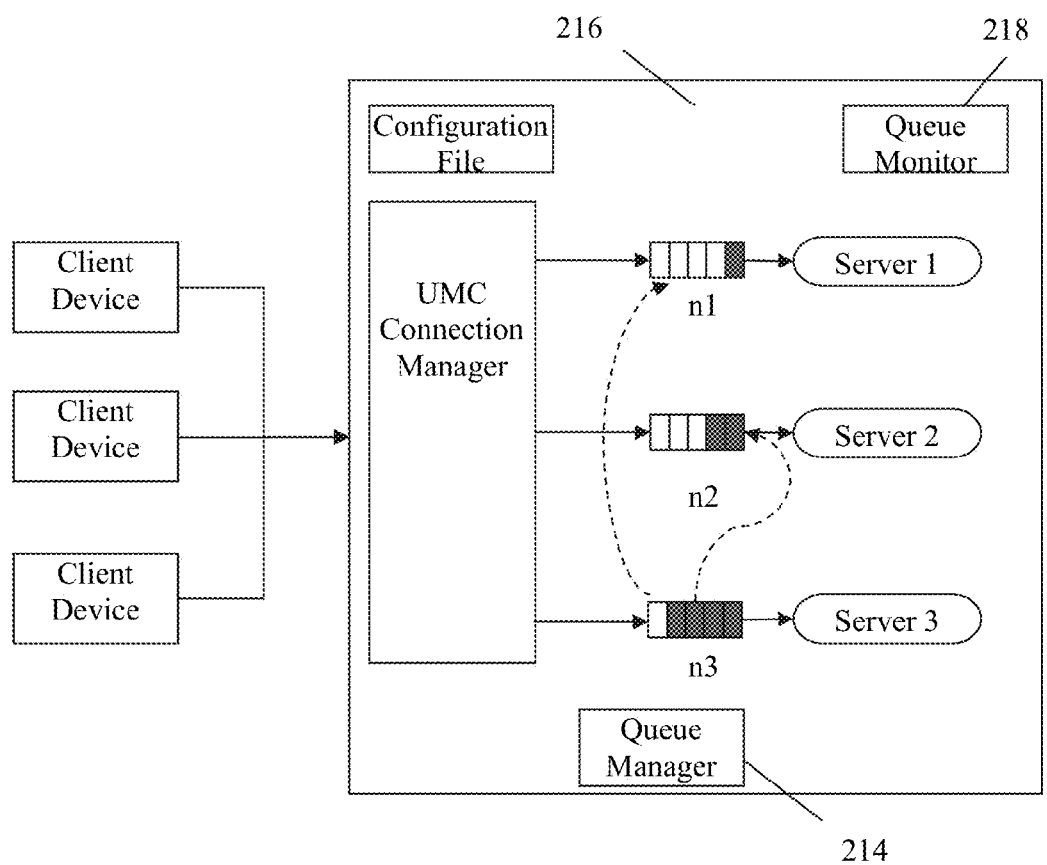
FIG. 3 illustrates the working of a load balancing module, in accordance with an embodiment of the present subject matter.

FIG. 3 illustrates the working of the load balancing module 216, wherein there are three queues having number of entries as n1, n2 and n3 at time T. The queue manager 214 spins at the rate of w: i.e., after each interval t1*n1, wherein the interval is equal to dT. After each interval, i.e., dT, the queue manager 214 load balances the queues. Therefore, at time T+dT, queue lengths for each queue is (n1+n2+n3)/3. The FIG. 3 illustrates the load distribution across the queues, wherein when the queue n3 is loaded more than n1 and n2, the load from n3 is distributed to n2 and n1. The load balancing module 216, balances the load across the queues when difference between the mean and the max load is greater than the threshold defined.

The system 102 further comprises of a queue monitor 218 configured to monitor the message queues corresponding to the service and the transcode related to the service managed by the queue manager 214. The queue monitor 218 further comprises the fault detection and handling module 220 configured to detect a state of the server in the unified communication system, wherein the fault detection and handling module 220 dynamically routes the messages in the message queue to a next available server. The queue monitor 218 further uses a memory map file to determine the number of servers attached to the message queue, the message written in the message queue, and the message read from the message queue for each time interval, wherein the servers may be application servers or processes. The queue monitor 218 may also determine, per transcode-wise queues, a queue name, a number of messages in the queue, a number of servers reading from the queues, and a number of client applications writing on the queue, and a rate at which the queue is being read by the servers. Based on the rate, the number of servers, and the depth of the queue, an appropriate action may be taken to achieve high performance depending upon the respective application.

Figure 4:
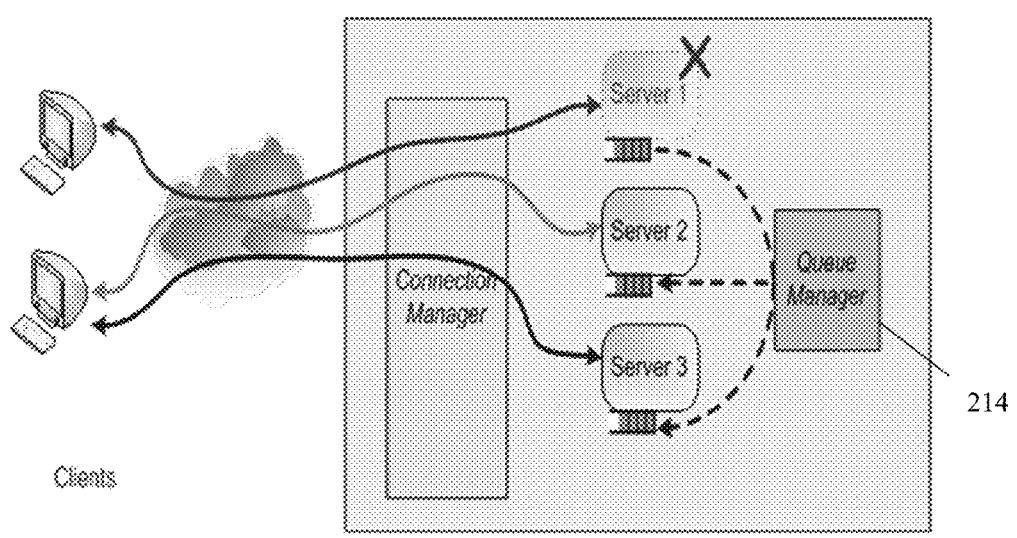
FIG. 4 illustrates the working of a fault detection and handling module, in accordance with an embodiment of the present subject matter.

FIG. 4 illustrates the working of the fault detection and handling module 220. As shown in FIG. 4, even if failure of server 1 occurs, messages in the queue are routed to other available servers, i.e., server 2 or server 3. Faults may occur if communication or processing has been stuck for a transaction, or if a thread is deadlocked, or if a thread gets killed. If the server for any thread is dead, another server may be added by the fault detection and handling module 220. Also, if the depth of the queue is full, servers may be added by the fault detection and handling module 220.

The UMC configuration file may be used to configure the load balancing and the fault detection and dynamic routing features of the system 102. In an exemplary embodiment of the system 102, the UMC configuration file can be configured as follows:

Configuration File:

```
<?xml version="1.0"?>
<catalog>
    <service_name name="MATCHING">
        <Load_balancing>
            <num_sample_for_loadbalancing>100</num_sample_
            for_loadbalancing>
            <sleep_time_between_samples>500000</sleep_time_
            between_samples>
            <route_threshold>50</route_threshold>
        </Load_balancing>
        <transcode trnscode="300">
            <loadbalancing>Y</loadbalancing>
        </transcode>
    </service_name>
</catalog>
```

Wherein, 'num_sample_for_loadbalancing' specifies the number of samples used for loadbalancing task, 'sleep_time_between_samples' specifies how often sampling is done, and 'route_threshold' determines the threshold for initiating the load balancing. If the number of messages in the queue for the transcode is greater than average number of messages in queues for the transcode by the threshold, then load balancing and dynamic routing may be invoked.

Figure 15:
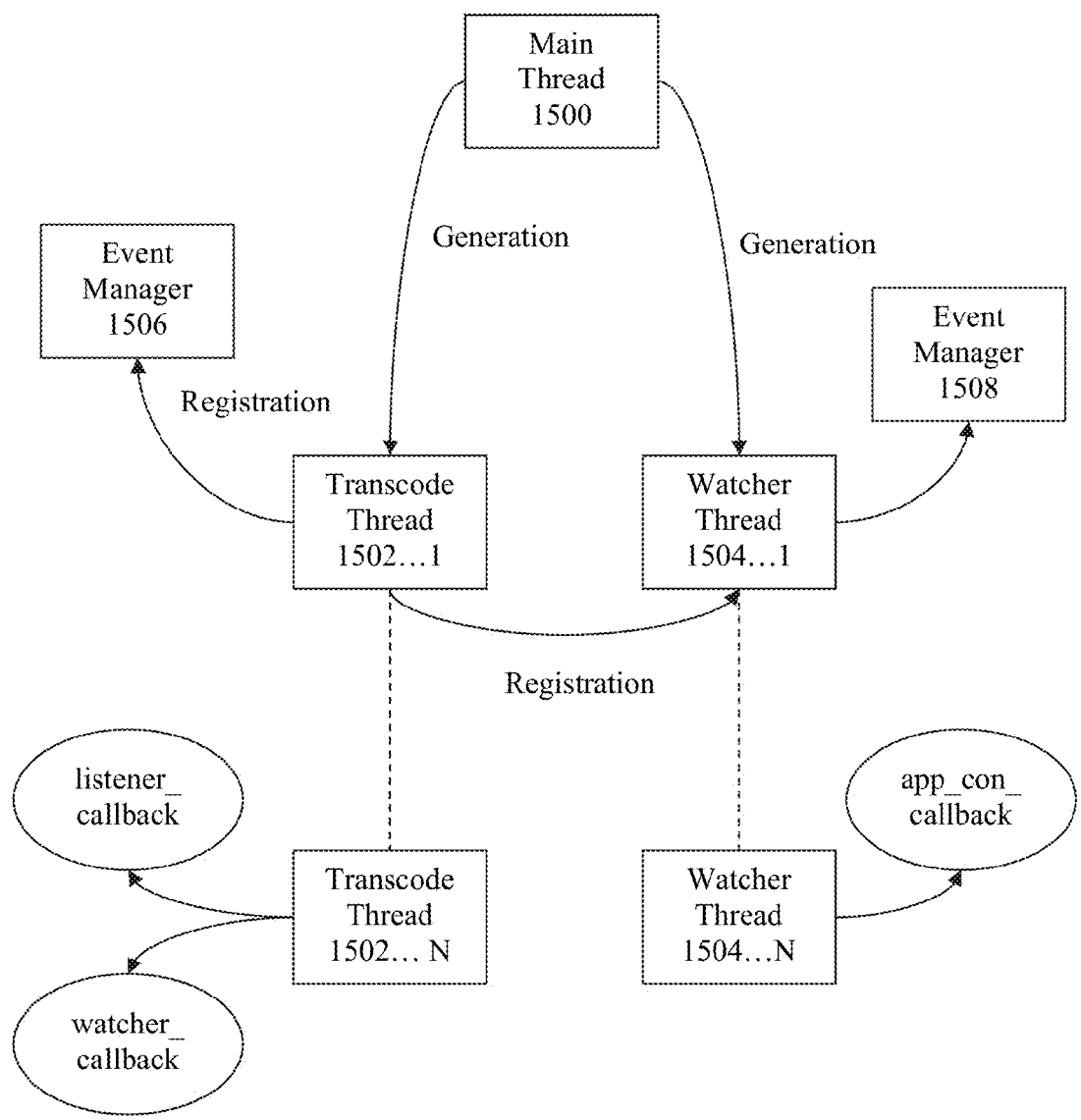
FIG. 15 illustrates a representation of the integration of the main thread, the transcode thread and the watcher thread, in accordance with an embodiment of the present subject matter.

Referring now to FIG. 15, a representation of the integration of a main thread 1500, a transcode thread 1502 and a watcher thread 1504 is shown, in accordance with an embodiment of the present subject matter. The processes of the queue manager 214 are implemented by the queue manager 214. In one implementation, each of the processes of the queue manager 214 can be initialized by the queue manager 214. The processes of the queue manager 214 include the main thread 1500, one or more transcode thread(s) 1502 and one or more watcher thread(s) 1504, coupled to the one or more transcode thread(s) 1502. In an implementation, the processes of the queue manager 214 are capable of being executed in one or more processors 202. The queue manager 214 is configured to manage one or more message queues in the peer-to-peer communication network. In one implementation, the one or more message queues are managed based on the execution of the processes of the queue manager 214.

In operation, the queue manager 214 monitors or listens for requests incoming from the client and the server. In one implementation, the queue manager 214 may listen for requests using a UNIX domain socket. The requests are initiated by one or more of the clients 104. The main thread reads an XML file to get the parameters for the service and initializes the data structure for the queue manager 214. The main thread 1500, after getting one or more values for the transcode, creates/generates the transcode thread 1502 for each transcode. The main thread 1500 further generates the watcher thread 1504 to monitor the queue. In parallel, the transcode thread 1502 initializes the listener for the transcode to receive the request from the server and the client and further creates/registers the Event Manager 1506 to handle various events for the transcode. Further, the event "app_conn_callback" is registered on a listen socket to get the request for the transcode. Further, if monitoring is required, connection to the watcher thread 1504 is made, and a registration request is sent to the register for any event from the watcher thread 1504 by calling the watcher_callback function.

The watcher thread 1504 creates the Event Manager 1508 to handle various events between the transcode threads 1502 and the watcher threads 1504. Further, the watcher thread 1504 creates and registers the listener to accept a connection from the transcode threads 1502 by execution of the app_con_callback function. The watcher thread 1504, on checking for the request from the transcode thread 1502, determines if routing to another queue is required. The watcher thread 1504 also checks the message processing rate of the queue to determine if the server attached to the queue is active.

Figure 5:
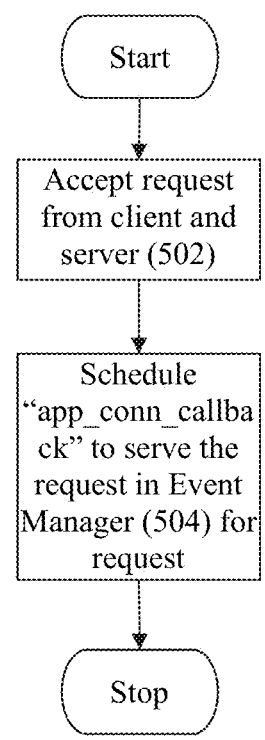
FIG. 5 illustrates a method to execute listener_callback function, in accordance with an embodiment of the present subject matter.
Figure 6:
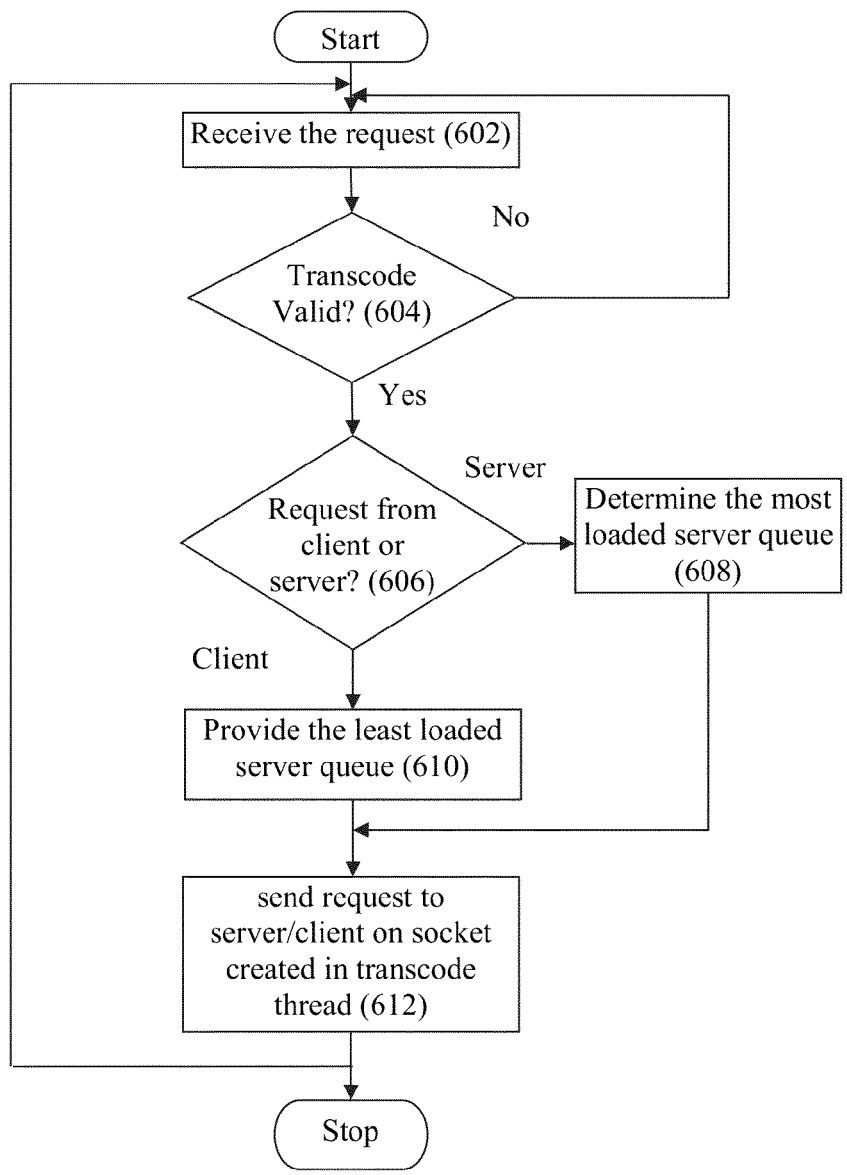
FIG. 6 illustrates a method to execute app_con_callback function, in accordance with an embodiment of the present subject matter.

The implementation of the system 102 may be further illustrated by referring to FIG. 5, wherein a method for execution of a listener_callback function is described. The listener_callback function accepts the request from the client and the server (step 502). In the next step, 504, an app_conn_callback function is scheduled to serve the request in an event manager for the request. FIG. 6 illustrates the stepwise execution of the app_conn_callback function. At the first step (step 602) the request is received and validity of the transaction code is checked (step 604). Further, at step 606, it is determined if the request is from the client or the server, based on a flag in the request. In the next step 608, if the request is from the server, the most loaded server queue is determined. If the request is from the client, the least loaded server queue is provided (step 610). Further at step 612, request is sent to the server or the client on a socket created in the transcode thread 1502.

Figure 7:
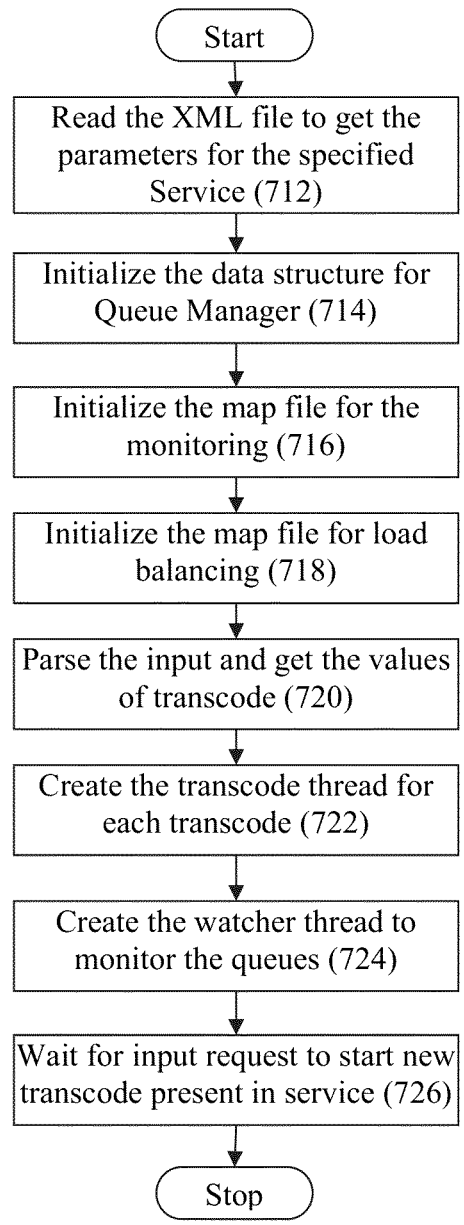
FIG. 7 illustrates a method for the execution of a main thread, in accordance with an embodiment of the present subject matter.

Further, FIG. 7 illustrates the implementation of the main thread 1500. In first step 712, the XML configuration file is read to get parameters for the service. In the next step 714, the data structure for the queue manager 214 is initialized. In third step 716, the memory map file is initialized for monitoring the queue for various transcode updates by the servers using the queue. In fourth step 718, the memory map file is initialized for monitoring the queue for transcodes requiring load balancing updates by the servers and the queue manager 214. In fifth step 720, the input is parsed and values of the transcode are received. In sixth step 722, the transcode thread 1502 for each transcode is created. In the seventh step 724, the watcher thread 1504 to monitor the queue is created. In the eighth step 726, a wait is initiated for the input request to start a new transcode thread 1502 present in the service.

Figure 8:
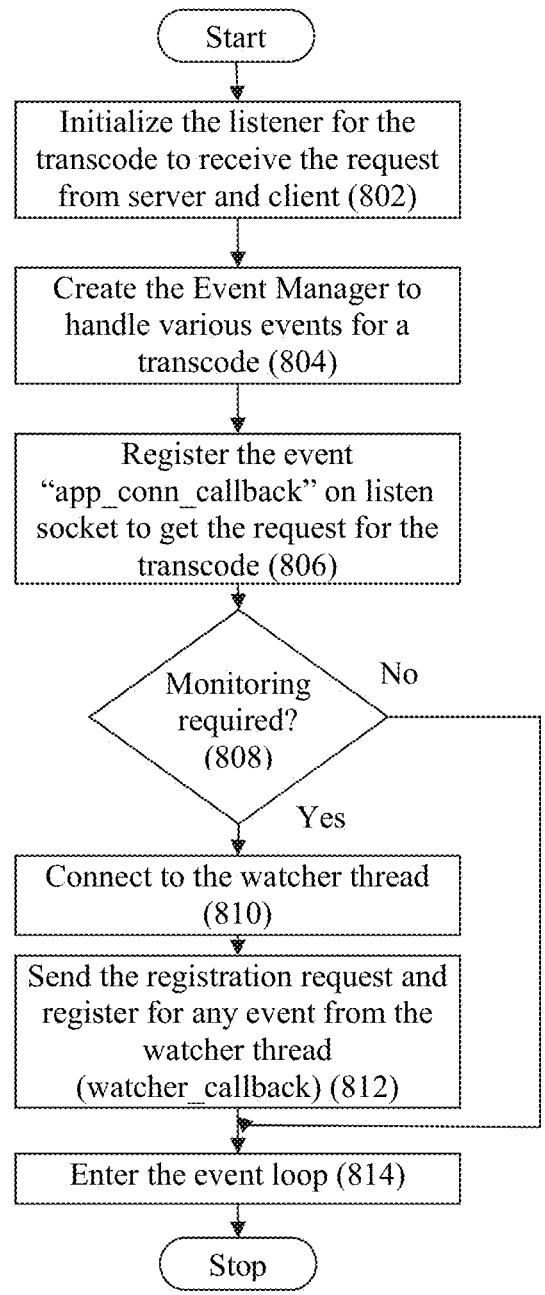
FIG. 8 illustrates a method for the execution of a transcode thread, in accordance with an embodiment of the present subject matter.

Further, in FIG. 8, the implementation of the transcode thread 1502 is described. In first step 802, the listener is initialized for the transcode to receive the request from the server and the client. In second step 804, the event manager is created to handle various events for the transcode. In third step 806, the event app_conn_callback is registered on a listen socket to get the request for the transcode. In fourth step 808, it is determined if monitoring is required. Further at step 810, connection to the watcher thread 1504 is executed, if monitoring is required based on the settings configured in the configuration file by the user. At step 812, the registration request is sent and registration for any event from the watcher thread 1504 is executed by calling the watcher_callback function. In the final step 814, an event loop is entered into.

Figure 9:
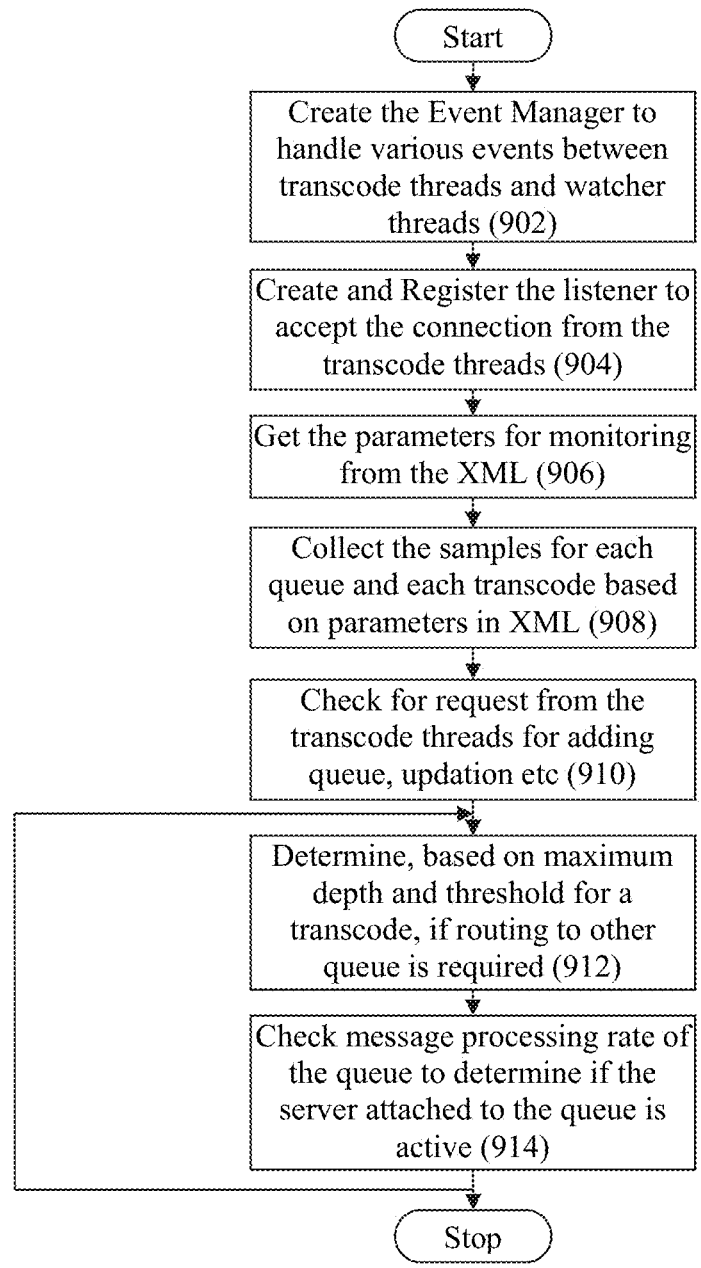
FIG. 9 illustrates a method for the execution of a watcher thread, in accordance with an embodiment of the present subject matter.

Further, the implementation of the watcher thread 1504 is illustrated in the FIG. 9. In first step 902, the event manager is created to handle various events between the transcode threads 1502 and the watcher threads 1504. In the next step 904, a listener is created and registered to accept the connection from the transcode threads 1502. In third step 906, parameters for monitoring from the XML configuration file are received. In fourth step 908, samples for each queue and each transcode based on parameters in the XML configuration file are collected. In fifth step 910, the request from the transcode threads 1502 is checked for adding to the queue or updating the queue. In sixth step 912, it is determined if routing to another queue is required, based on the maximum depth and the threshold for the transcode. In seventh step 914, the watcher thread 1504 also checks the message processing rate of the queue to determine if the server attached to the queue is active.

Figure 10:
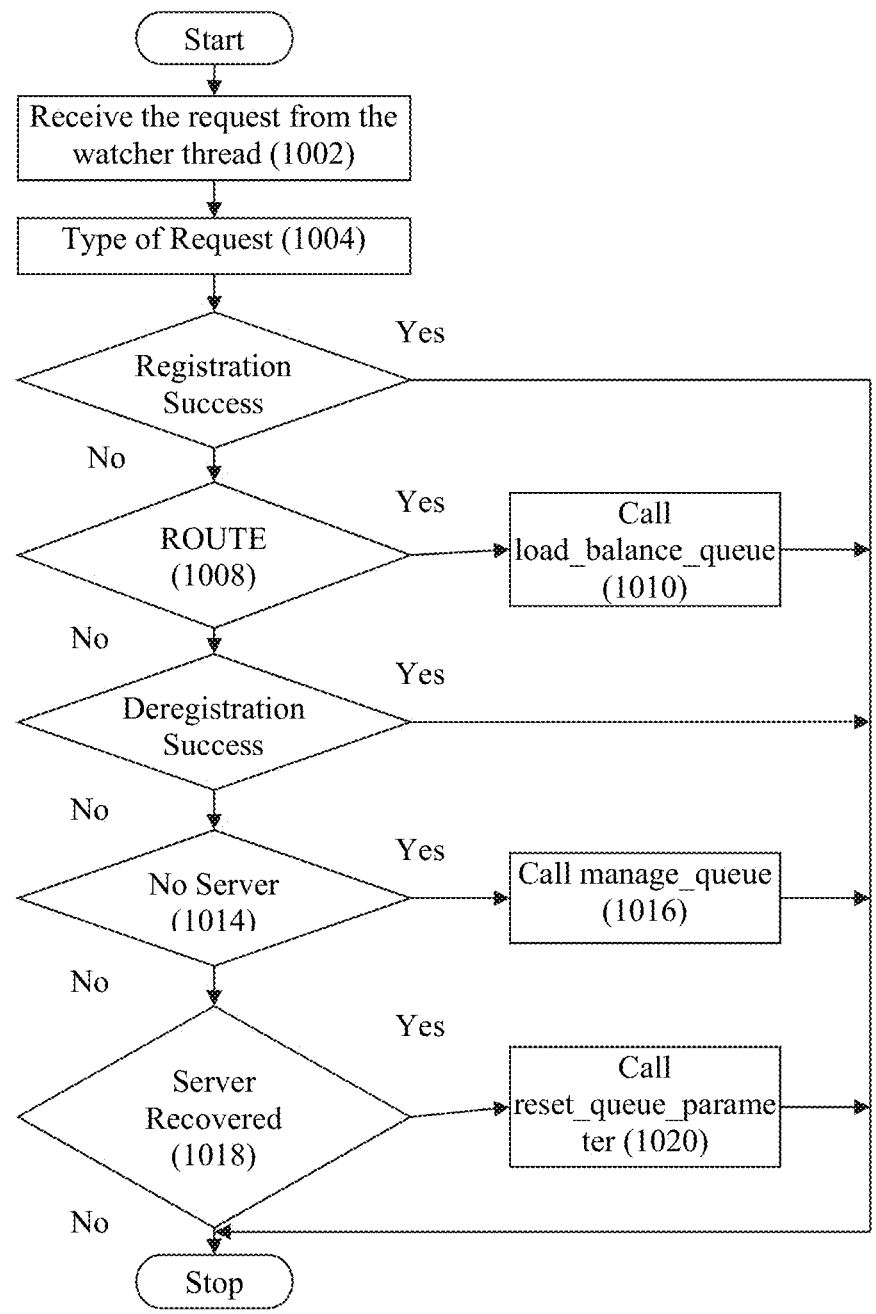
FIG. 10 illustrates a method for the execution of a watcher_callback function, in accordance with an embodiment of the present subject matter.

Further, in FIG. 10, the implementation of watcher_callback function is described. In first step 1002, the request is received from the watcher thread 1504. In second step 1004, the type of the request is identified as one of "Registration Success," "ROUTE," "Deregistration Success," "No Server," or "Server Recovered." If the request is the "ROUTE" request (step 1008), the load_balance_queue function is called (step 1010). If the request is the "No Server" request (step 1014), the manage_queue function is called (step 1016). If the request is the "Server Recovered" request (1018), the reset_queue_parameter function is called (step 1020).

Figure 11:
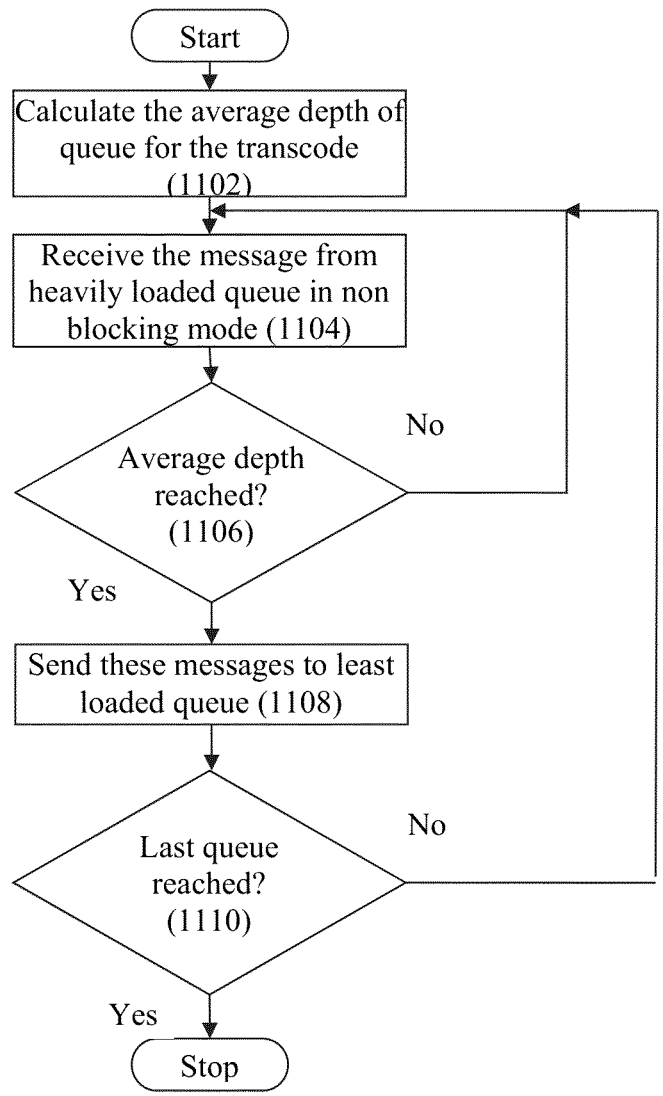
FIG. 11 illustrates a method for the execution of a load_balance_queue function, in accordance with an embodiment of the present subject matter.

Further, in FIG. 11, the implementation of the load_balance_queue function is described. In first step 1102, the average depth of the queue for the transcode is calculated. In second step 1104, the message is received from a heavily loaded queue in non blocking mode. In the next step 1106, it is determined if the average depth is reached. If the average depth is reached, the messages are sent to the least loaded queue (step 1108). At step 1110, it is determined if the last queue is reached. The steps 1104 to 1108 are performed until the last queue is reached.

Figure 12:
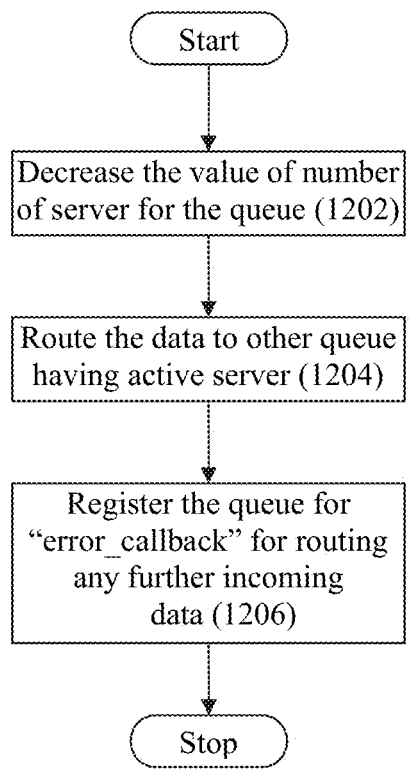
FIG. 12 illustrates a method for the execution of a manage_queue function, in accordance with an embodiment of the present subject matter.

Further, in FIG. 12, the implementation of the manage_queue function is described. In first step 1202, the value of the number of the servers for the queue is decreased. In second step 1204, data is routed to another queue having an active server. In third step 1206, the queue is registered for the error_callback function for routing any further incoming data.

Figure 13:
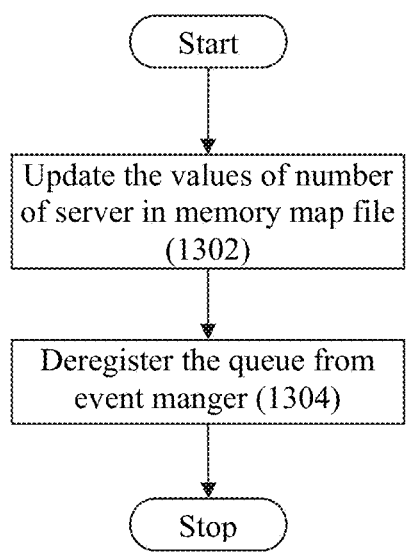
FIG. 13 illustrates a method for the execution of a reset_queue_parameter function, in accordance with an embodiment of the present subject matter.

Further, in FIG. 13, the implementation of the reset_queue_parameter function is described. In first step 1302, the values of the number of the servers in the memory map file are updated. In second step 1304, the queue from the event manager is deregistered.

Figure 16:
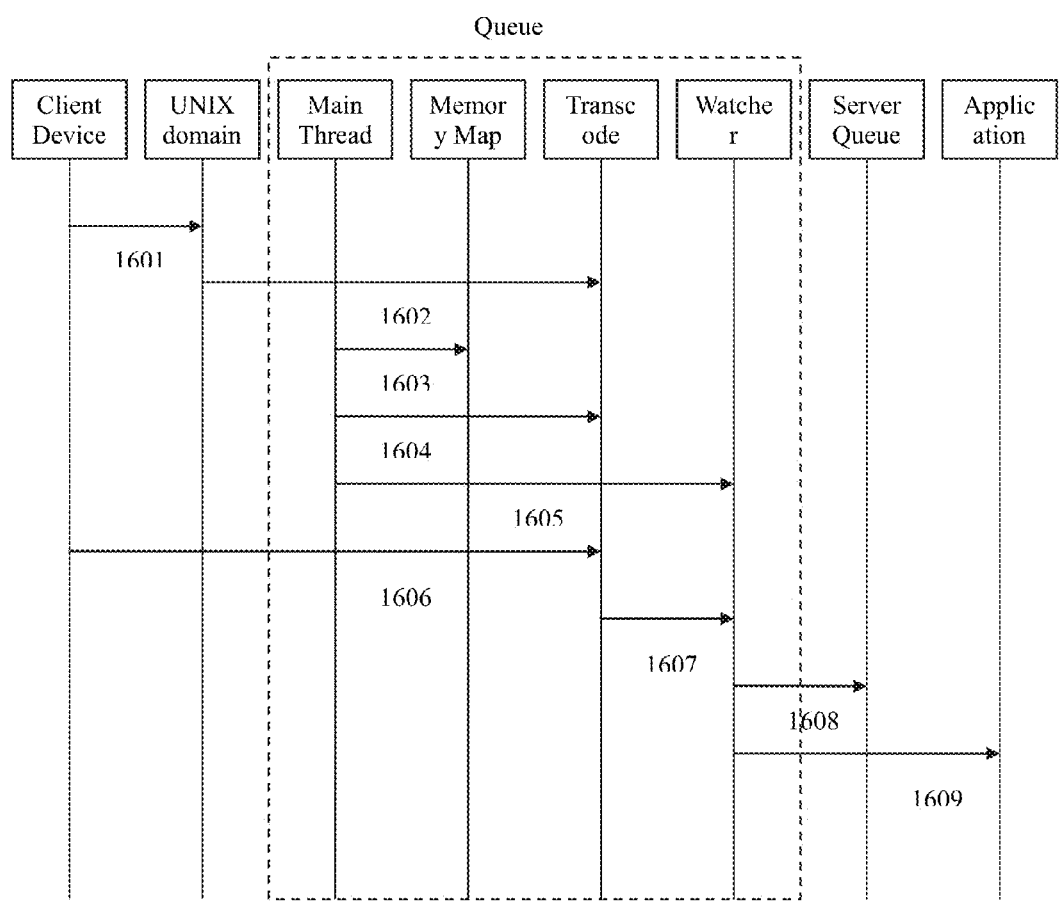
FIG. 16 illustrates a data and message flow between pluralities of entities through a queue manager, in accordance with an embodiment of the present subject matter.

Referring now to FIG. 16, a data and message flow between a plurality of entities through a queue manager 214 is shown, in accordance with an exemplary implementation of the present subject matter. The queue manager 214 manages one or more message queues in the peer-to-peer communication network. The queue manager 214, in order to manage one or more message queues, includes execution of a plurality of queue manager 214 processes, such as the main thread 1500, the transcode thread 1502, and the watcher thread 1504. In one implementation, the queue manager 214 may also comprise a queue monitor 218 to monitor the message queues.

In one implementation, the request is accepted from the client and the server by the UNIX domain socket layer (step 1601). The transcode thread 150 receives the request through the UNIX domain socket layer and receives the parameters for the service (step 1602). The main thread 150 initializes the memory map file for the monitoring and for the load balancing (step 1603). Further, the main thread 1500 creates the transcode thread 1502 for each transcode (step 1604) and creates the watcher thread 1504 to monitor the message queue (step 1605). In parallel, the listener is initialized for the transcode thread 1502 to receive the request from the client and the server (step 1606). Further, the transcode thread 1502 sends the registration request for the queue to add for monitoring, if the request is configured in the configuration file and it registers for any event from the watcher thread 1504 (step 1607). The watcher thread 1504 determines, based on the maximum depth and the threshold for the transcode, if routing to another queue is required and checks, based on the number of messages processed from the queue, to determine if the servers attached to the queue are active (step 1608). If routing is required, the messages in the message queue are dynamically routed to the next available server (step 1609).

Figure 14:
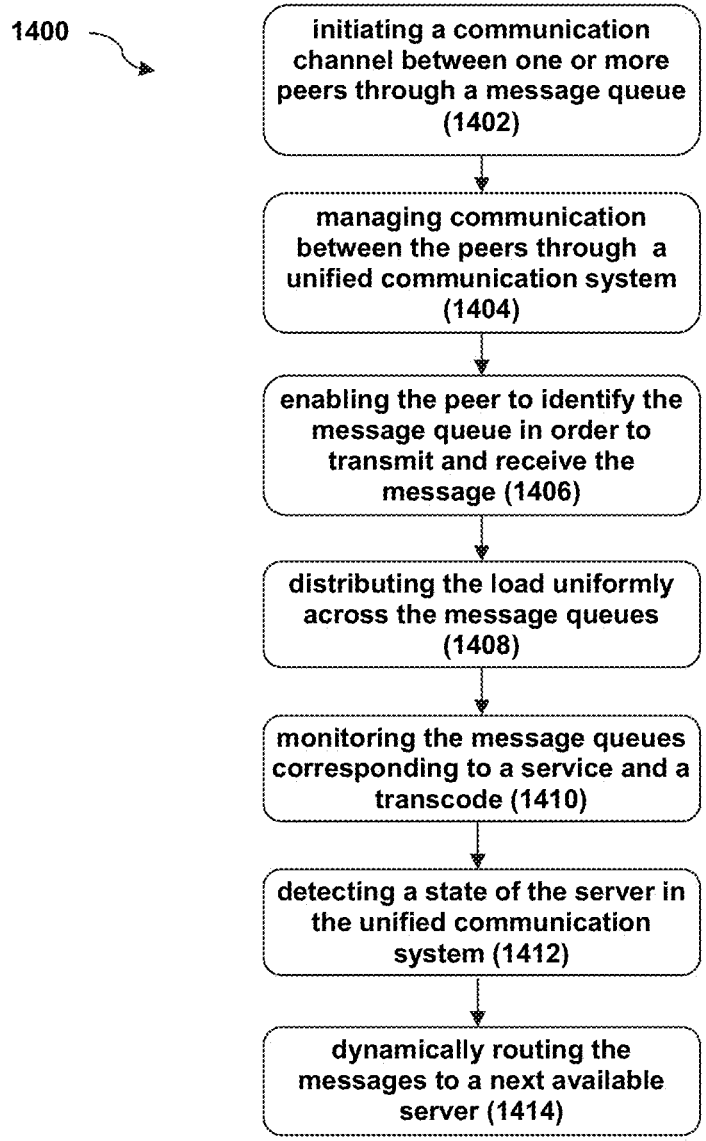
FIG. 14 illustrates a method for managing one or more message queues in the peer-to-peer communication network, in accordance with an embodiment of the present subject matter.

Referring now to FIG. 14, a method 1400 for managing one or more message queues in a peer-to-peer communication network is shown, in accordance with an embodiment of the present subject matter. The method 1400 may be described in the general context of computer executable instructions. Generally, computer executable instructions can include routines, programs, objects, components, data structures, procedures, modules, functions, etc., that perform particular functions or implement particular abstract data types. The method 1400 may also be practiced in a distributed computing environment where functions are performed by remote processing devices that are linked through a communications network. In a distributed computing environment, computer executable instructions may be located in both local and remote computer storage media, including memory storage devices.

The order in which the method 1400 is described is not intended to be construed as a limitation, and any number of the described method blocks can be combined in any order to implement the method 1400 or alternate methods. Additionally, individual blocks may be deleted from the method 1400 without departing from the spirit and scope of the subject matter described herein. Furthermore, the method can be implemented in any suitable manner though hardware, software, firmware, or a combination thereof. However, for ease of explanation, in the embodiments described below, the method 1400 may be considered to be implemented in the above described system 102.

At block 1402, a communication channel is initiated between one or more peers through a message queue. The communication may be initiated by the initialization module 212.

At block 1404, the communication between the peers through a unified communication system is managed. In one implementation, the communication may be managed by the queue manager 214.

At block 1406, the peer is enabled to identify the message queue in order to transmit and receive the message. In one implementation, the peer is enabled to identify the message queue by the queue manager 214.

At block 1408, load is distributed uniformly across the message queues for a transaction. In one implementation, the load is distributed across the message queues by the load balancing module 216.

At block 1410, message queues corresponding to a service and a transcode are monitored. In one implementation, the monitoring is performed by the queue monitor 218.

At block 1412, a state of the server in the unified communication system is detected. In one implementation, the detection is performed by the fault detection and handling module 220.

At block 1414, the messages are dynamically routed to a next available server. In one implementation, the routing is performed by the fault detection and handling module 220.

Although implementations for methods and systems for managing one or more message queues in a peer-to-peer communication network have been described in language specific to structural features and/or methods, it is to be understood that the appended claims are not necessarily limited to the specific features or methods described. Rather, the specific features and methods are disclosed as examples of implementations for managing one or more message queues in a peer-to-peer communication network.

What is claimed is:

1. A method for managing one or more message queues in a peer-to-peer communication network to improve the efficiency and reliability of the peer-to-peer communications network, the method comprising:
   providing a processor and a non-transitory memory coupled to said processor, wherein the non-transitory memory comprises programmed instructions;
   initiating a communication channel between two or more peers over a session through a message queue;
   managing communication between the peers through a unified communication system, the unified communication system including a plurality of received message queues on a plurality of servers, and enabling one or more of the peers to identify the message queue in order to transmit and receive a message, wherein managing further comprises:
   uniformly distributing a load across the plurality of received message queues for a transaction in the unified communication system based upon a pre-defined condition;
   monitoring the plurality of received message queues corresponding to a service and a transcode related to the service, wherein monitoring further comprises:
   detecting a load state of the server in the unified communication system to determine a load distribution of the unified communications system, wherein a received message in the received message queue is dynamically routed to a next available server based on the load distribution;
   wherein the managing, the distributing, the monitoring and the detecting are performed by the processor using the programmed instructions stored in the non-transitory memory; and
   wherein monitoring further comprises using a memory map file to determine a number of servers attached to the received message queue, the message written in the received message queue, and a message read from the received message queue, for each of a plurality of time intervals.

2. The method of claim 1, wherein the session refers to a communication handle between two peers.

3. The method of claim 1, wherein the two or more peers comprise at least one of a client, a server in case of a client-server relationship, a sender, a receiver if the client-server relationship does not exist, or a combination thereof.

4. The method of claim 1, wherein the transcode is a code identifying a type of a transaction requested from the service.

5. The method of claim 1, wherein the pre-defined condition defines a threshold for initializing a uniform distribution of load across the plurality of received message queues.

6. A system for managing one or more message queues in a unified communication system for a peer-to-peer communication network to improve the efficiency and reliability of the peer-to-peer communications network, the system comprising:
   a processor; and
   a non-transitory memory coupled to the processor, wherein the processor is capable of executing a plurality of modules stored in the memory, and wherein the plurality of modules comprise:
   an initialization module that initiates a communication channel between two or more peers over a session through a message queue;
   a queue manager that manages communication between peers through a unified communication system, wherein the queue manager enables the peer to identify the message queue in order to transmit and receive a message, the queue manager further comprises:
   a load balancing module that uniformly distributes load across the message queue for a transaction in the unified communication system based upon a pre-defined condition;
   a queue monitor that monitors the message queue corresponding to a service and a transcode related to the service, wherein the queue monitor further comprises:
   a fault detection and handling module that detects a state of the server in the unified communication system, wherein the fault detection and handling module dynamically routes the messages in the message queue to a next available server; and wherein the queue monitor further uses a memory map file to determine a number of servers attached to the message queue, the message written in the message queue, and a message read from the message queue for each of a plurality of time intervals.

7. The system of claim 6, wherein the session refers to a communication handle between two peers.

8. The system of claim 6, wherein the peers comprise at least one of a client, a server in case of a client-server relationship, a sender, a receiver if the client-server relationship does not exist, or a combination thereof.

9. The system of claim 6, wherein the transcode is a code identifying a type of transaction requested from the service.

10. The system of claim 6, wherein the pre-defined condition defines a threshold for initializing a uniform distribution of load across the message queue.

11. A non-transitory, machine-readable storage medium having embodied thereon a computer program for managing one or more message queues in a peer-to-peer communication network, the storage medium comprising:

a program code for initiating a communication channel between two or more peers over a session through a message queue;

a program code for managing communication between the peers through a unified communication system and enabling one or more of the peers to identify the message queue in order to transmit and receive a message, wherein the managing further comprising:

a program code for uniformly distributing a load across a plurality of received message queues for a transaction in the unified communication system based upon a pre-defined condition;

a program code for monitoring the plurality of received message queues corresponding to a service and a transcode related to the service, wherein the monitoring further comprises:

a program code for detecting a load state of a server in the unified communication system, wherein a received message in the message queue is dynamically routed to a next available server of the unified communication system based on the load state of the server; and wherein the program code for monitoring further comprises using a memory map file to determine a number of servers attached to the received message queue, the message written in the received message queue, and a message read from the received message queue, for each of a plurality of time intervals.

* * * * *